April 13, 1943.　　　T. L. FAWICK　　　2,316,509
SHAFT COUPLING
Filed July 11, 1940　　　2 Sheets-Sheet 1
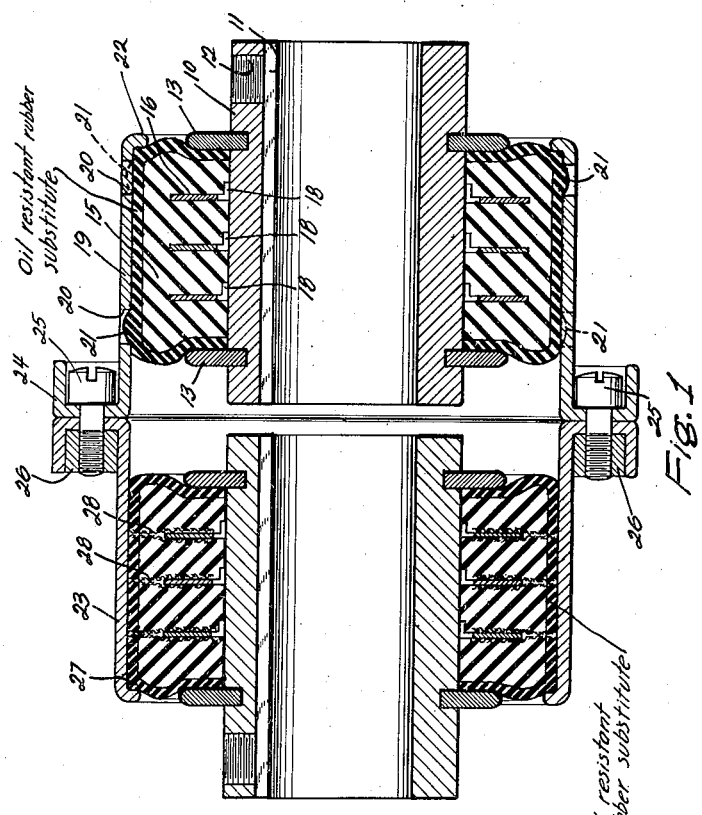
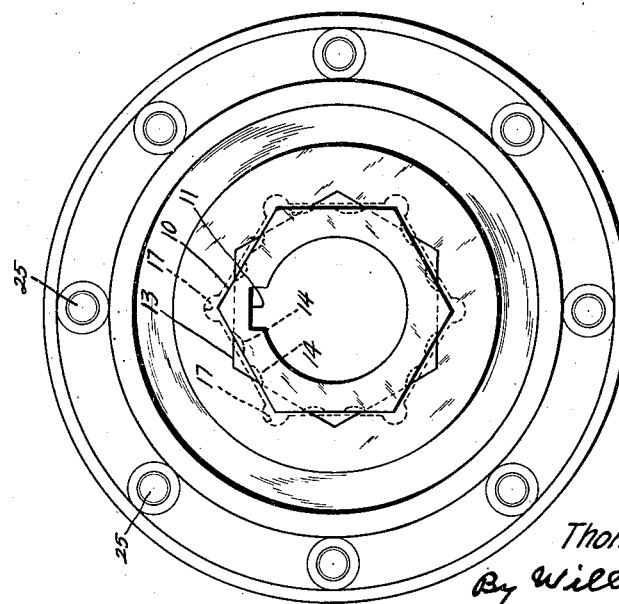
INVENTOR
Thomas L. Fawick
By Willard D. Eakin
ATTORNEY April 13, 1943.  T. L. FAWICK  2,316,509
SHAFT COUPLING
Filed July 11, 1940  2 Sheets-Sheet 2
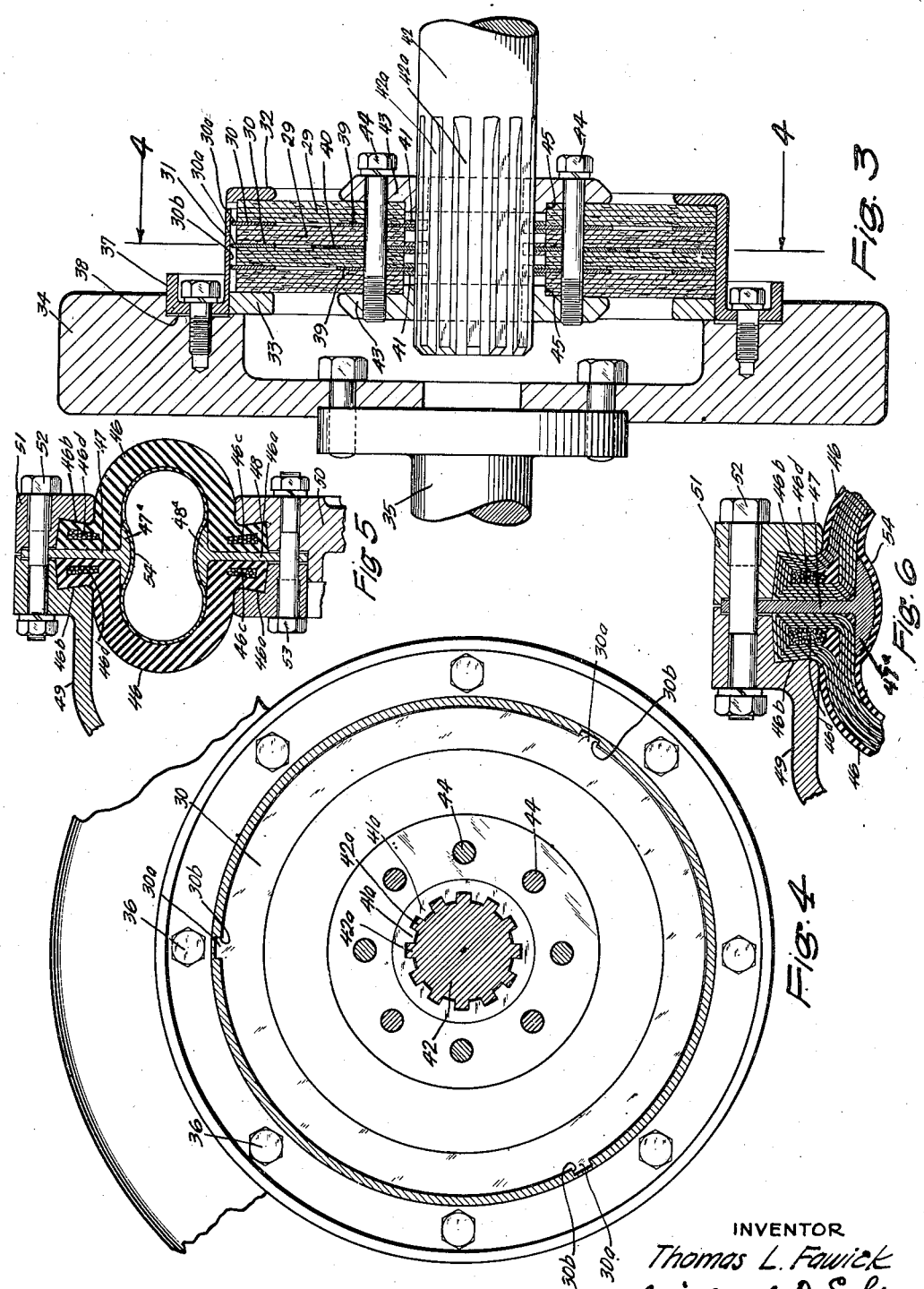
INVENTOR
Thomas L. Fawick
By Willard D. Eakin
ATTORNEY Patented Apr. 13, 1943

2,316,509

UNITED STATES PATENT OFFICE 2,316,509

SHAFT COUPLING

Thomas L. Fawick, Akron, Ohio

Application July 11, 1940, Serial No. 344,930

5 Claims. (Cl. 64—11)

This invention relates to flexible shaft couplings and its chief objects are to provide economy of construction; ease of assembly; lightness; durability; freedom from undesirably projecting parts; compensation for shaft misalignment throughout a wide range without great power loss, excessive heating or high shaft-bearing loads; high strength for torque transmission; and desirable cushioning of torque.

Of the accompanying drawings:

Fig. 1 is a longitudinal middle section of a flexible coupling assembly embodying my invention in one of its preferred forms.

Fig. 2 is an end elevation of the same as viewed from the right of Fig. 1.

Fig. 3 is a longitudinal middle section of a flexible coupling embodying my invention in another of its preferred forms.

Fig. 4 is a section on line 4—4 of Fig. 3.

Fig. 5 is a section of a modification.

Fig. 6 is a fragmentary section of the same on a larger scale.

Referring to the drawings, the coupling shown in Figures 1 and 2 is of dual construction and comprises an externally hexagonal hub member 10 internally formed to fit a cylindrical shaft and with a key-way 11 for keying it to a shaft and a tapped hole 12 for the usual set-screw.

Near each end the hub member 10 is externally formed with an annular groove in which respectively are mounted clamping washers 13, 13 each of which is formed with a hexagonal hole slightly larger than the hexagonal outer surface of the hub member, so that the washer can be easily slid onto the hub member until it is at the position of the annular groove and then given a twelfth of a turn, to the position in which the adjacent washer is shown in Fig. 2, to enterlock the washer against movement in either direction lengthwise of the hub member.

To prevent relative rotation of the washer the hub member can be peened into the groove, as at 14, 14, Fig. 2, in the space between adjacent sides of the hexagonal hole in the washer.

Clamped between the two washers 13 is a torque-transmitting and cushioning body 15 of rubber or similar material, preferably having at least an outer surface layer of polymerized vinyl chloride or other rubber-like material adapted to resist the deleterious effects of oils upon rubber, examples of such materials being those currently sold under the trade names Koroseal, Duprene and Thiokol, and permissibly the member 15 may be composed entirely of such a material.

Preferably the body 15 has within it one or more thin metal washers 16, 16 having hexagonal holes giving them a sliding fit on the hub member 10, so that they interlock with it for torque transmission. The washers 16 and the body 15 are molded and vulcanized as a unit and preferably they are adhered to the adjacent material of the body 15 during vulcanization, by the use of any of the several well known expedients for adhering metal to rubber or the like.

To avoid cracking of the metal of the washer 16 at the angles that otherwise would be formed by adjacent sides of the hexagonal hole such angles are eliminated and arcuate edge faces 17, 17, Fig. 2 are provided instead, by a punching operation, which can be the same operation that forms the hexagonal hole or can be a separate punching operation. For strengthening effect the margins of the metal between adjacent arcuate faces 17 can be bent at a right angle to the body of the washer to form flanges 18, 18 as shown in Fig. 1.

Surrounding the torque transmitting and cushioning body 15 is a metal stamping 19, which radially restrains the resiliently deformable body 15 when it is extended radially in being clamped at its inner periphery between the clamping washers 13, and the stamping 19 may be formed with circumferential series of holes 20, 20, preferably staggered as shown in Fig. 1, to receive bulges 21, 21 of the resiliently deformable material for resisting relative slippage of the two members.

Preferably the stamping 19 is formed with an inturned flange 22 to prevent creeping of the material of the member 15 as it is deformed in the clamping of its inner margin.

For strength and for easy attachment of the stamping 19 to another rotary member, here shown as a generally similar stamping 23, the stamping 19 is formed with an outwardly and then backwardly turned flange 24 which is formed with holes for a series of bolts 25, 25 having nuts 26, 26 non-rotatably mounted in the channel of the other stamping 23.

The other half of the dual assembly, inclusive of the stamping 23, is in all respects the same as the half that has just been described except that as it is here shown adequate frictional engagement or vulcanized adhesion between the resilient body, 27, and the stamping 23 is contemplated, and stiffening sheets 28, 28 of fabric are shown as being incorporated in and molded as a unit with the body of resilient material, such stiffening sheets lessening the amount of torsional "wind-up" resulting from a given torque load if less wind-up is desired for the dual assembly as a whole than would be permitted if the fabric were omitted from both of the resilient bodies.

In the manufacture of the coupling only the resilient body requires to be dealt with by the rubber factory, with such metal or fabric washers as may be desired, and the outer, restraining metal stamping, 19 or 23, if vulcanized adhesion of the resilient body to the stamping is desired.

In assembling the parts, preferably the clamping washer 13 that is to be nearest the inturned flange 22 of the outer metal stamping 19 is first mounted upon the hub member 10 and secured against turning thereon by peening as represented at 14, 14, Fig. 2. After that the resilient body 15 with such washers as it may have in it is slipped onto the hub member.

The body 15 preferably is externally of such size, before it is deformed, that stamping 19 can be easily slipped onto it, either before or after the body 15 has been slid onto the hub member.

The second clamping washer 13 is then mounted upon and forcibly slid on the hub member 10 to the position of the adjacent groove and then given a twelfth of a turn to lock it in the groove against longitudinal movement on the hub member, water lubrication preferably being provided for easy rotation of the clamping washer with relation to the resilient body. This last placed washer is then secured against rotation by peening of the metal of the hub member as at 14. A suitable restraining member can be temporarily employed opposite the flange 22, during the clamping operation, to prevent excessive spread of the deformable member in contact with the casting 19 before it has developed a non-slipping pressure against the latter.

The axial clamping of the inner peripheral margin of the deformable body 15 causes its side walls to bulge as shown and develops a strong radial pressure between its outer face and the stamping 19 and causes the interlocking bulges 22 to form in the holes 20 of the stamping for strong torque transmission.

The unit thus assembled is then ready to be mounted upon a shaft and secured at its outer periphery to another rotary member, such as the generally similar unit shown in Fig. 1.

For adequate torque-transmitting anchorage of the resilient body 15 at the short-radius position of its inner peripheral margin, the metal washers, driven by the hub member, are highly effective, because both as to adhesion, if employed, and as to the frictional grip resulting from the clamping pressure, they provide a large area of driving contact with the deformable material and, as to the clamping pressure, its effect is multiplied by the number of the inset washers, as in the case of a multiple disc clutch. Also, when the inset washers are closely spaced they correspondingly develop high clamping pressure against the adjacent material for a given amount of deformation of the resilient body as a whole, the resistance of the material to flow being the greater because of the narrowness of the flow passages and being cumulative along the surfaces of the washers and also along the inner surface of the stamping 19.

In this embodiment as described the deformable body 15 is permanently held under a radial compressive force between the hub 10 and the surrounding member 19 which causes the torque to be transmitted largely by compressive forces tangential to the hub member and avoids such over-straining of the rubber or the like such as may occur when it is held under radial tension.

In the embodiment shown in Figures 3 and 4 the deformable torque-transmitting and cushioning assembly comprises, as here shown, a plurality of rubberized fabric universal-joint coupling discs 29, 29, which can be of any of the types heretofore commonly used between universal-joint spiders.

Between adjacent discs 29, at their outer peripheries, are mounted thin and flexible metal washers 30, 30 which at their outer margins are formed with key projections 30ª, 30ª which occupy key-ways 30ᵇ, 30ᵇ formed in the inner face of an annular outer casting 31.

The assembly of intercalated fabric discs 29 and metal washers 30 is clamped, throughout its outer annular margin, between an inwardly extending end flange 32, formed on the casting 31, and a ring 33 which abuts a part of one of the rotary structures, here shown as a fly-wheel 34 mounted upon a shaft 35, under the clamping force of cap-screws 36, 36 by which an outwardly extending flange 37 formed on the casting 31 is drawn toward the fly-wheel 34. The original dimensions of the parts may be such that when cap-screws 36 are originally set up with appropriate clamping force a small space 38 will remain between the flange 37 and the fly-wheel 34, to permit further take-up after the assembly has been in service.

Mounted between adjacent fabric discs 29 at their inner peripheral margins are thin and flexible metal washers 39, 39, 40, the middle one, 40, of the three washers here shown being of relatively large outside diameter, to provide a resiliently stiffening and steadying effect for the series of fabric discs, but with sufficient flexibility to permit substantial shaft misalignment. The inner edge corners of the outer washers 30 and the outer edge corners of the inner washers 39, 40 preferably are rounded off as shown, for avoidance of cutting of the fabric discs.

At their inner peripheries the washers 39, 40 have welded to them narrow strengthening rings 41, 41, which can be of the same sheet-metal, and each of the three-ply inner margins is formed with splines 41ª, 41ª which slidably interfit with splines 42ª, 42ª formed on a shaft 42.

The assembly of intercalated fabric discs 29 and washers 39, 40, at its inner margin, is clamped between clamping rings 43, 43 which are splined on the shaft 42 and drawn together by clamping bolts 44, 44.

Preferably the clamping rings 43 are formed with shoulders 45 for centering the two outer fabric discs and the strengthening rings 41 can be of such outside diameter as to serve as centering means for the fabric discs.

In this embodiment of my invention, and also in the embodiment shown in Figures 1 and 2, the deformable torque-transmitting and cushioning means sustains the torque evenly throughout the circle of the assembly, as distinguished from the sustension of the torque at the localized positions of bolts or clamps as in the use of universal-joint coupling discs between spiders.

Also, in both of these embodiments, large-area contact is provided for transmission of torque to and from the deformable torque-transmitting element, which is desirable whether or not adhesion or only frictional grip is relied upon.

In the embodiment of Figures 3 and 4 frictional grip alone may be relied upon and the fabric discs 29 can be formed in the absence of all of the metal parts and later assembled therewith as shown.

In the embodiment shown in Figures 5 and 6 two cord-reinforced rubber bag-halves 46, 46 are formed at their inner and outer peripheries with annular flanges 46$^a$, 46$^a$ and 46$^b$, 46$^b$, which are clamped against interposed metal rings 47, 48, to provide a fluid-container which has torque-transmitting sidewalls which are unconfined and freely-flexing in service, for transmitting torque between an outer bell-shaped member 49 and an inner, hub member 50.

The flanges preferably are provided with wire or cord cores 46$^c$, 46$^c$ and 46$^d$, 46$^d$.

At the outer periphery the bag flanges 46$^b$ and the interposed ring 47 are as a unit clamped against complemental surfaces on the member 49 by a ring 51, which is formed with faces fitting two faces of the adjacent bag flange and by clamping bolts such as the bolt 52 which extend through registered holes in the clamping ring 51, the metal ring 47 and the member 49, the bolts, for economy of manufacture and ease of assembly, having snug fit with the holes in the metal clamping members only in their middle portions, which middle portions serve as dowels which positively interlock the three metal members against relative rotary movement.

Likewise clamping bolts such as the bolt 53 function at the inner periphery.

Preferably the fluid container made up of the two bag-halves is provided with an inner tube 54, provided with an inflating stem (not shown).

An important feature of this embodiment shown in Figures 5 and 6 is that the interposed metal rings are in cross-section of T shape, providing annular, confining-flange portions 47$^a$, 47$^a$ as to the outer ring 47 and 48$^a$, 48$^a$ as to the inner ring 48, which restrain the material of the bag halves when the material is pressed against them in a radial direction by the drawing up of the bolts 52 or 53 in an axial direction. Thus these flanges provide quite large additional areas of driving engagement for the flanges of the bag-halves, and they also define, with the adjacent portions of the other metal clamping members, narrow spaces which serve as "bottlenecks" to prevent free escape of the bag material under the clamping pressure and thus make it possible to obtain high compressive force against the bag-half flanges, without excessive "flow" of the material, for transmission of heavy torque.

Thus the T-heads or flanges of the rings 47, 48 provide these two factors for strong anchorage of the bag-halves throughout the circle of the assembly, and they have been found to be very effective for this purpose.

Further modifications are possible within the scope of my invention as defined in the appended claims.

Some of the subject matter of the present application was disclosed in my application Serial Number 158,592, filed August 11, 1937, which was, for a time, copending with this application.

I claim:

1. A flexible shaft-coupling comprising a pair of transmission shafts in series, inner and outer rigid members mounted upon them respectively and defining between them an annular space, a flexible, torque-transmitting fluid-container having an axial length greater than its radial extent and mounted in said space and held to a radially shallow cross-sectional form by said rigid members, at least one of the peripheries of said fluid-container being formed, adjacent and axially inward from an approximately cylindrical outer surface thereof, with a radially projecting anchorage flange comprising resiliently deformable material, and means for clamping said flange in an axial direction, and the said clamping means having a surface complementary to and bearing against the said approximately cylindrical outer surface of the fluid-container.

2. A flexible shaft-coupling comprising a pair of transmission shafts in series, inner and outer rigid members mounted upon them respectively and defining between them an annular space, a flexible, torque-transmitting fluid-container having an axial length greater than its radial extent and mounted in said space and held to a radially shallow cross-sectional form by said rigid members, at least one of the peripheries of said fluid-container being formed, adjacent and axially inward from an approximately cylindrical outer surface thereof, with a radially projecting anchorage flange comprising resiliently deformable material, means for clamping said flange in an axial direction, and a substantially inextensible member embraced by portions of said flange and thus subjected to the clamping pressure for resisting radial flow of the said material, and the said clamping means having a surface complementary to and bearing against the said approximately cylindrical outer surface of the fluid-container.

3. A flexible shaft-coupling comprising a pair of transmission shafts in series, inner and outer rigid members mounted upon them respectively and defining between them an annular space, a flexible, torque-transmitting fluid-container having an axial length greater than its radial extent and mounted in said space and held to a radially shallow cross-sectional form by said rigid members, at least one of the peripheries of said fluid-container being formed, adjacent and axially inward from an approximately cylindrical outer surface thereof, with a radially projecting anchorage flange comprising resiliently deformable material, means for clamping said flange in an axial direction, and a substantially inextensible member embraced by portions of said flange and thus subjected to the clamping pressure for resisting radial flow of the said material, said inextensible member being formed with a relatively large portion for sustaining the radial pressure of said material resulting from the axial clamping pressure, and the said clamping means having a surface complementary to and bearing against the said approximately cylindrical outer surface of the fluid-container.

4. A flexible shaft-coupling comprising a pair of transmission shafts in series, inner and outer rigid members mounted upon them respectively and defining between them an annular space, a flexible, torque-transmitting fluid-container having an axial length greater than its radial extent and mounted in said space and held to a radially shallow cross-sectional form by said rigid members, at least one of the peripheries of said fluid-container being formed, adjacent and axially inward from an approximately cylindrical outer surface thereof, with a radially projecting anchorage flange comprising resiliently deformable material, means for clamping said flange in an axial direction, and a substantially inextensible member embraced by portions of said flange and thus subjected to the clamping pressure for resisting radial flow of the said material, said fluid-container comprising two trough-shaped annular members axially facing each other and said inextensible member being of T-shape in cross-section with the head of the T engaging inner faces of the trough-shaped members, and the said clamping means having a surface complementary to and bearing against the said approximately cylindrical outer surface of the fluid-container.

5. A flexible shaft-coupling comprising a pair of transmission shafts in series, inner and outer rigid members mounted upon them respectively and defining between them an annular space, a flexible, torque-transmitting fluid-container having an axial length greater than its radial extent and mounted in said space and held to a radially shallow cross-sectional form by said rigid members, at least one of the peripheries of said fluid-container being formed, adjacent and axially inward from an approximately cylindrical outer surface thereof, with a radially projecting anchorage flange comprising resiliently deformable material, means for clamping said flange in an axial direction, and a substantially inextensible member embraced by portions of said flange and thus subjected to the clamping pressure for resisting radial flow of the said material, said inextensible member being interlocked with the adjacent space-defining member for torque transmission, and the said clamping means having a surface complementary to and bearing against the said approximately cylindrical outer surface of the fluid-container.

THOMAS L. FAWICK.